United States Patent
Chen et al.

(10) Patent No.: US 10,042,872 B2
(45) Date of Patent: *Aug. 7, 2018

(54) OPTIMIZING TABLES WITH TOO MANY COLUMNS IN A DATABASE

(71) Applicant: INTERNATIONAL BUSINESS MACHINES CORPORATION, Armonk, NY (US)

(72) Inventors: Yaoliang Chen, Shanghai (CN); Min Gong, Shanghai (CN); CaiQin Ma, Shanghai (CN); Yu Wang, Shanghai (CN); Xiaomin Xu, Shanghai (CN); Junchi Yan, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 526 days.

This patent is subject to a terminal disclaimer.

(21) Appl. No.: 14/746,465

(22) Filed: Jun. 22, 2015

(65) Prior Publication Data

US 2016/0342649 A1    Nov. 24, 2016

Related U.S. Application Data

(63) Continuation of application No. 14/719,433, filed on May 22, 2015.

(51) Int. Cl.
   *G06F 17/30* (2006.01)

(52) U.S. Cl.
   CPC .. *G06F 17/30315* (2013.01); *G06F 17/30327* (2013.01); *G06F 17/30339* (2013.01); *G06F 17/30454* (2013.01); *G06F 17/30466* (2013.01); *G06F 17/30498* (2013.01)

(58) Field of Classification Search
   None
   See application file for complete search history.

(56) References Cited

U.S. PATENT DOCUMENTS

| | | | |
|---|---|---|---|
| 6,381,605 B1 * | 4/2002 | Kothuri | G06F 17/30327 |
| 7,966,343 B2 | 6/2011 | Yang et al. | |
| 8,037,057 B2 | 10/2011 | Burger | |
| 8,200,668 B2 | 6/2012 | Carlin et al. | |
| 8,204,880 B2 | 6/2012 | Vignet | |
| 2005/0240615 A1 * | 10/2005 | Barsness | G06F 17/30498 |
| 2014/0181076 A1 | 6/2014 | Au et al. | |
| 2015/0178305 A1 * | 6/2015 | Mueller | G06F 17/30129 |
| | | | 707/693 |

OTHER PUBLICATIONS

List of IBM Patents or Patent Applications Treated as Related.

* cited by examiner

*Primary Examiner* — Anh Tai Tran
(74) *Attorney, Agent, or Firm* — Tutunjian & Bitetto, P.C.; Keivan Razavi

(57) ABSTRACT

Methods and systems for database optimization include detecting a plurality of columns in an unoptimized database that co-appear in queries to the database. The plurality of columns are compacted into a single hyper-column to form an optimized database. Each entry in the hyper-column includes data from a corresponding entry in each of the plurality of columns. An interface is generated for the optimized database that accepts queries according to a schema for the unoptimized database and translates the queries into queries according to a schema for the optimized database.

10 Claims, 4 Drawing Sheets

| Last name, First name | Email | Phone | Street address | Age | Income |
|---|---|---|---|---|---|
| | | | | | |
| | | | | | |
| | | | | | |
| | | | | | |

FIG. 3

OPTIMIZING TABLES WITH TOO MANY COLUMNS IN A DATABASE

CROSS REFERENCE TO RELATED APPLICATIONS

This application is a Continuation application of co-pending U.S. patent application Ser. No. 14/719,433, filed on May 22, 2015, incorporated herein by reference in its entirety.

BACKGROUND

Technical Field

The present invention relates to database optimization and, more particularly, to optimizing joined tables having a large number of columns.

Description of the Related Art

Databases are used for storage and efficient retrieval of a wide variety of data. In some scenarios, multiple tables may be joined into a single, large table. This can produce tables with very large widths, as each constituent table's columns are added to the final table.

Using a database that has too many columns can result in several difficulties. For example, when there is a large number of columns, the time needed to perform a write operation increases. In addition, many database systems have a storage limit for how much information can be stored in a single row—as the number of columns increases, more information is needed per row.

These circumstances arise in businesses such as banking, where data stores are often poorly designed and are not query-efficient. Their data cannot easily be migrated for reasons of legacy support. Existing solutions store multiple physical views of a logic table called "projections." A "projection" is a column subset of logic table schema. These use query samples to optimize overlapped projection decisions to guarantee that each query will only refer to one projection. However, these techniques are designed for distributed architectures and provide little benefit to single-machine and legacy row-based database instances. Furthermore, they may need significant data duplication and data migration to outside database instances.

SUMMARY

A method for database optimization includes detecting a plurality of columns in an unoptimized database that co-appear in queries to the database. The plurality of columns are compacted into a single hyper-column to form an optimized database. Each entry in the hyper-column includes data from a corresponding entry in each of the plurality of columns. An interface is generated for the optimized database that accepts queries according to a schema for the unoptimized database and translates said queries into queries according to a schema for the optimized database.

A method for database optimization includes detecting columns in an unoptimized database that co-appear in at least one of where and select queries to the database by clustering across all columns according to co-appearance using an approximation of K-minimum cut. The detected columns are compacted into a single hyper-column to form an optimized database. Each entry in the hyper-column includes data from a corresponding entry in each of the detected columns. An index for the hyper-column is generated, including an R-tree index if the hyper-column consists of numerical data and a B-tree index if the hyper-column consists of textual data. Entries in the hyper-column are compressed if the entries in the hyper-column consist of textual data. An interface is generated for the optimized database that accepts queries according to a schema for the unoptimized database and translates said queries into queries according to a schema for the optimized database, wherein said interface comprises a virtual view of the database according to the schema for the unoptimized database.

A system for database optimization includes a database rebuild module configured to detect a plurality of columns in an unoptimized database that co-appear in queries to the database and to compact the plurality of columns into a single hyper-column to form an optimized database. Each entry in the hyper-column includes data from a corresponding entry in each of the plurality of columns. A database interface module is configured to accepts queries according to a schema for the unoptimized database and to translate said queries into queries according to a schema for the optimized database.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 3 is a diagram of an exemplary combined table with a hyper-column in accordance with the present principles.

DETAILED DESCRIPTION

Embodiments of the present principles merge columns in a table that are frequently read together while maintaining an interface layer that replicates the functionality of the unmerged columns for compatibility with existing queries and software. Toward this end, the present embodiments reorganize an existing table's schema to be more compact while supporting the original table's schema as a virtual view. The present embodiments rebuild the original schema into an internal schema for physical storage, thereby supporting fast decision on table column compacting, compression on compacted columns, and query optimization on the rebuilt table.

To accomplish this, the present embodiments compact multiple columns into "hyper-columns." A hyper-column is defined herein to refer to two or more columns from the original table schema that are compacted into a single column. Selecting columns to compact into hyper columns can be performed based on a determination of which columns frequently co-appear in select or where clauses in queries. The hyper-column represents the real data storage configuration of physical tables after the table is rebuilt. Hyper-columns support retrieving the original table columns' data fields as well as providing indexability and compression.

As compared to existing column grouping methods, the present embodiments enable traditional row-based database to use some key advantages of column-based stores, such as efficient I/O query performance. No effort is needed for extension of the original database and table rebuilding is transparent to user applications, with no data migration to outside databases needed. Moreover, the present embodiments are historical-query-aware, which can dynamically optimize column-grouping decisions according to a user's query behaviors.

Figures 1, 2:
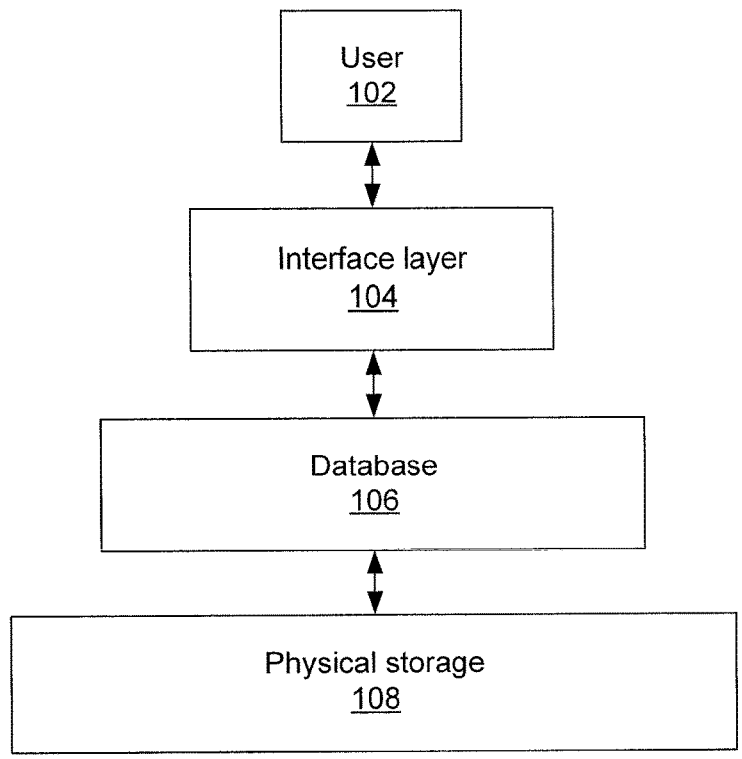
FIG. 1 is a block diagram of components of an optimized database system having an interface layer in accordance with the present principles.
FIG. 2 is a diagram of an exemplary combined table in accordance with the present principles.

Referring now to the drawings in which like numerals represent the same or similar elements and initially to FIG. 1, a general diagram of different components of the present embodiments is shown. A user 102 issues queries to an optimized database 106 through an interface layer 104. The user 102 may be an individual database administrator providing queries directly, but may also be a piece of software issuing queries to the database 106 automatically.

The database 106 is stored on physical storage 108. It is contemplated that any form of storage may be employed, including for example a hard drive, flash storage, or random access memory. The database 106 itself is optimized for storage and includes one or more hyper-columns. As the user 102 sees a pre-optimized view of the database 106 that is provided by interface layer 104. The interface layer accepts queries from the user 102 and translates them into a form appropriate to the optimized schema of the database 106. The interface layer 104 then performs requested operations on the database 106 and provides results to the user that reflect the pre-optimization schema that the user 102 expects.

Referring now of FIG. 2, an exemplary table 200 is shown before optimization. The table 200 includes a set of columns 202, each of which includes one or more data cells 204. The table 200 may be a combined table that includes columns 202 from multiple origin tables or may be an original table itself with a large number of columns. During operation, certain columns 202 will be referenced together frequently. For example, the "Last name" column and the "First name" column could be accessed together often. Such columns are ripe for being compacted into hyper-columns.

Referring now to FIG. 3, an exemplary optimized table 300 is shown. The table 300 includes a hyper-column 302 that compacts the "Last name" and "First name" columns 202 of the unoptimized table 200. Each data cell 304 of the hyper-column 302 includes the information of all data cells 204 from the respective row of unoptimized table 200.

It should be noted, particularly for data cells that include textual data, simply concatenating the data may create data cells that are very large. The data cells 304 of the hyper-column 302 may therefore be compressed; using the larger corpus of data to provide a superior compression ratio to that which would be achievable if the columns were kept separate.

Figure 4:
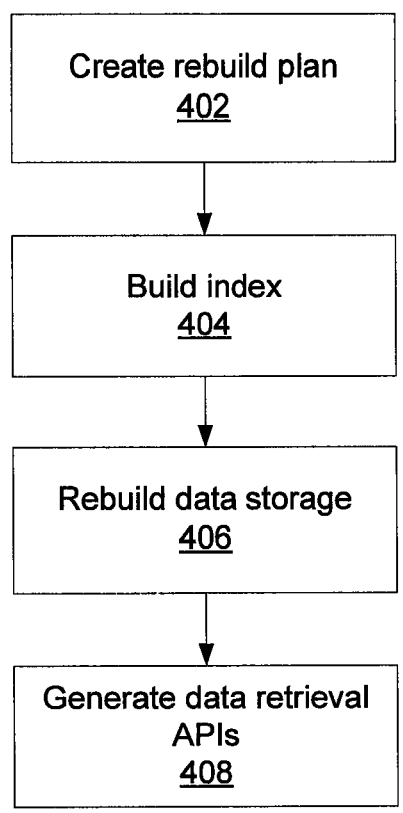
FIG. 4 is a block/flow diagram of a method/system for rebuilding a database in accordance with the present principles.

Referring now to FIG. 4, a method for optimizing a database 106 is shown. Block 402 creates a rebuild plan for the original database and schema. This is performed by, for example, observing queries to the database 106 and noting which columns are frequently called together. Block 402 then performs clustering based on the frequency of co-appearance. This clustering may split the columns of the database 106 into K groups according to a user-input parameter or according to an automatically determined optimal number. The rebuild plan may also include determinations as to whether clustered columns need to be indexed or compressed.

More specifically, given the query history of a table, the columns that co-appear in selection clauses are identified as being part of a select-set, while the columns that co-appear in where clauses are identified as being part of a where-set. The pair-wise co-appearing frequency of a column a and a column b is found as:

$$f(a,b)=p(a,b)/\min(p(a),p(b))$$

where p(a) is the appearing frequency of the column a in the union of the select set and the where set, p(b) is the appearing frequency of the column b in the union of sets, and p(a,b) is a co-appearing frequency for the columns a and b on the union of sets.

Block 402 then constructs a co-appearing weighted undirected graph, with nodes of the graph representing columns and edges of the graph representing a co-appearing frequency for the connected columns. Clustering can then be performed on the graph using, for example, K minimum-cut or an approximation thereof.

Block 404 builds indexes of the hyper-columns defined by the rebuild plan. These indexes aid navigation within combined data cells 304. Indexing is performed based on the types of data stored in the cells 304. For original columns 202 that were all-numeric that are compacted into a hyper-column, an R-tree index is used. A B-tree index is adopted when combining multiple columns having a "text" type.

Block 406 then executes the rebuild plan by generating hyper-columns and performing whatever compression is needed. Block 408 generates data retrieval APIs for the rebuilt database, including provisions for translating between a logical view of the original table and the actual stored data in hyper-columns using the indexes.

Figure 5:
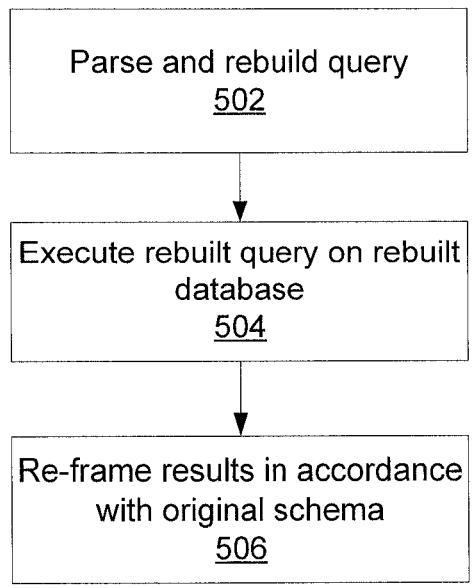
FIG. 5 is a block/flow diagram of a method/system for providing an interface with an optimized database in accordance with the present principles.

Referring now to FIG. 5, a block/diagram of a method/system for executing a query is shown. Block 502 receives a query in, for example, structured query language (SQL), from the user 102. The query is based on the original schema to perform one or more operations. Block 502 parses the query and translates the original schema to reflect the rebuilt schema of the optimized database 106. Block 504 then executes the rebuilt query on the optimized database 106 and receives whatever results are produced. Block 506 re-frames the results in accordance with the original schema and presents them to the user. In this manner, the interface 104 provides transparent translation for the user 102, which need not be aware of the optimization and rebuilding of the database 106.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of" for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C)

only, or the selection of all three options (A and B and C). This may be extended, as readily apparent by one of ordinary skill in this and related arts, for as many items listed.

Figure 6:
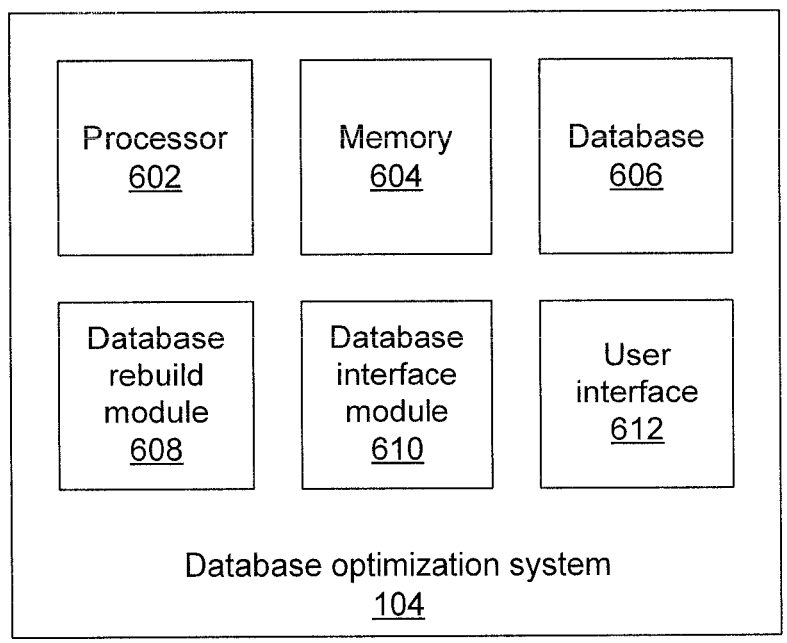
FIG. 6 is a block diagram of a database optimization system in accordance with the present principles.

Referring now to FIG. 6, a block diagram of a system for optimizing a database is shown. A database 606 is stored in a memory 604. The database 606 has some original schema and may have a large number of columns. A database rebuild module 608 employs processor 602 to identify columns in the database 606 that may be compacted into hyper-columns and performs such compaction, indexing and compressing information in the new hyper-columns as appropriate. The database rebuild module stores the optimized database 606 in the memory 604. A database interface module 610 interacts with, for example, some user interface 612 or other piece of software to receive queries to the database 606. The database interface module 610 provides to the user interface a virtual view of the database 606 that matches an original schema and translates incoming queries into the new schema of the rebuilt database 606. The database interface module then executes the query on the database 606 and re-frames the results to be in terms of the original schema before providing the results to the user interface 612.

Having described preferred embodiments of a system and method for optimizing tables with too many columns in a database (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for database optimization, comprising:
   detecting a plurality of columns in an unoptimized database that co-appear in queries to the database;
   compacting the plurality of columns into a single hyper-column using a processor to form an optimized database, wherein each entry in the hyper-column comprises data from a corresponding entry in each of the plurality of columns; and
   generating an interface for the optimized database that accepts queries according to a schema for the unoptimized database and translates said queries into queries according to a schema for the optimized database.

2. The method of claim 1, wherein the plurality of columns co-appear in select clauses.

3. The method of claim 1, wherein the plurality of columns co-appear in where clauses.

4. The method of claim 1, further comprising generating an index for the hyper-column.

5. The method of claim 4, wherein entries for the hyper-column comprise only numerical data and wherein the index is an R-tree.

6. The method of claim 1, further comprising compressing entries in the hyper-column if the entries in the hyper-column consist of textual data.

7. The method of claim 1, wherein detecting the plurality of columns that co-appear in queries to the database comprises performing clustering across all columns in the database.

8. The method of claim 7, wherein performing clustering comprises an approximation of K-minimum cut.

9. The method of claim 1, wherein generating the interface comprises generating a virtual view of the database according to the schema for the unoptimized database.

10. A method for database optimization, comprising:
    detecting a plurality of columns in an unoptimized database that co-appear in at least one of where and select queries to the database by clustering across all columns according to co-appearance using an approximation of K-minimum cut;
    compacting the plurality of columns into a single hyper-column using a processor to form an optimized database, wherein each entry in the hyper-column comprises data from a corresponding entry in each of the plurality of columns;
    generating an index for the hyper-column, comprising generating an R-tree index if the hyper-column consists of numerical data and generating a B-tree index if the hyper-column consists of textual data;
    compressing entries in the hyper-column if the entries in the hyper-column consist of textual data; and
    generating an interface for the optimized database that accepts queries according to a schema for the unoptimized database and translates said queries into queries according to a schema for the optimized database, wherein said interface comprises a virtual view of the database according to the schema for the unoptimized database.

* * * * *